(12) United States Patent
Bauer et al.

(10) Patent No.: US 8,857,415 B2
(45) Date of Patent: Oct. 14, 2014

(54) CHARGE AIR COOLER

(75) Inventors: Swen-Juri Bauer, Stuttgart (DE); Steve Beez, Masserberg (DE); Andreas Grüner, Hattenhofen (DE); Martin Janβen, Stuttgart (DE); Hans Jensen, Dettingen (DE); Rüdiger Knauβ, Kernen I.r. (DE); Andrea Teubner, Rainau-Schwabsberg (DE)

(73) Assignee: Mahle International GmbH (DE)

( * ) Notice: Subject to any disclaimer, the term of this patent is extended or adjusted under 35 U.S.C. 154(b) by 278 days.

(21) Appl. No.: 13/327,285

(22) Filed: Dec. 15, 2011

(65) Prior Publication Data

US 2012/0152212 A1   Jun. 21, 2012

(30) Foreign Application Priority Data

Dec. 16, 2010  (DE) .......................... 10 2010 063 265

(51) Int. Cl.
F02B 29/04   (2006.01)

(52) U.S. Cl.
USPC .......................................................... 123/542

(58) Field of Classification Search
USPC .................................................. 123/542, 563
See application file for complete search history.

(56) References Cited

U.S. PATENT DOCUMENTS

| | | | | |
|---|---|---|---|---|
| 4,565,175 A * | 1/1986 | Kaye | ............................. | 123/542 |
| 5,385,132 A * | 1/1995 | Lehman | ........................ | 123/542 |
| 6,257,211 B1 * | 7/2001 | Vela, Jr. | ........................ | 123/542 |
| 6,732,680 B1 * | 5/2004 | Beltramo et al. | .......... | 123/41.44 |
| 6,796,134 B1 * | 9/2004 | Bucknell et al. | ................ | 62/133 |
| 2002/0189255 A1 | 12/2002 | Callas et al. | | |
| 2006/0117748 A1 * | 6/2006 | Bundschuh et al. | ............ | 60/599 |
| 2007/0175617 A1 | 8/2007 | Brost et al. | | |
| 2007/0193731 A1 | 8/2007 | Lamich et al. | | |
| 2008/0295811 A1 * | 12/2008 | Holler et al. | ................... | 123/542 |
| 2009/0016910 A1 * | 1/2009 | Shih | .............................. | 417/406 |
| 2009/0056355 A1 | 3/2009 | Mesa et al. | | |
| 2011/0162597 A1 * | 7/2011 | Draheim et al. | ........... | 123/41.44 |
| 2011/0186273 A1 | 8/2011 | Gruner et al. | | |

FOREIGN PATENT DOCUMENTS

| | | |
|---|---|---|
| DE | 10215779 A1 | 11/2003 |
| DE | 10254016 A1 | 6/2004 |
| DE | 102007043992 A1 | 3/2009 |
| DE | 102008053802 A1 | 6/2009 |
| DE | 102008032816 A1 | 1/2010 |
| DE | 102008035880 A1 | 2/2010 |
| EP | 1785609 A1 | 5/2007 |
| EP | 1795847 A2 | 6/2007 |
| WO | WO-2005001366 A2 | 1/2005 |

OTHER PUBLICATIONS

English abstract for DE-102007043992.

(Continued)

*Primary Examiner* — M. McMahon
(74) *Attorney, Agent, or Firm* — Rader, Fishman & Grauer PLLC

(57) ABSTRACT

A charge air cooler for an internal combustion engine is disclosed. The charge air cooler includes at least one connecting piece for connection to at least one cooling circuit configured to conduct coolant. The charge air cooler includes at least one coolant pump for circulating the coolant. The at least one coolant pump is integrated in at least one flow path within the charge air cooler.

20 Claims, 2 Drawing Sheets

(56) References Cited

OTHER PUBLICATIONS

English abstract for DE-10215779.
English abstract for DE-10254016.
English abstract for DE-102008035880.
English abstract for DE-102008053802.
European Search Report dated Nov. 28, 2013 for EP-11191368.7.

\* cited by examiner

CHARGE AIR COOLER

CROSS-REFERENCES TO RELATED APPLICATIONS

This application claims priority to German patent application 10 2010 063 265.1 filed on Dec. 16, 2010, which is hereby incorporated by reference in its entirety.

TECHNICAL FIELD

The present disclosure relates to a charge air cooler of an internal combustion engine. The disclosure also relates to an internal combustion engine equipped with such a charge air cooler.

BACKGROUND

EP 1 795 847 A 2 discloses a generic charge air cooler which is composed of flat pipes, corrugated ribs, collection tanks and connecting pieces, wherein the individual parts of the charge air cooler are produced from aluminium and soldered to each other. In order to be able to reduce the number of individual parts of the charge air cooler and thereby make it easier to produce, a construction principle known from parallel flow condensers was transferred to the charge air cooler by arranging it in a housing through which the charge air can flow.

EP 1 785 609 A 1 discloses a further charge air cooler, in which charge air flows into and out of the housing thereof and thereby flows through the charge air cooler. The housing has a mounting opening into which the charge air cooler can be inserted and must be fastened with the connection plate thereof. This should in particular ensure that the charge air cooler forms a structural unit with the housing, which unit is more stable with respect to oscillations and vibrations.

Further charge air coolers are known from WO 2005/001366 A3 and DE 10 2007 043 992 B4.

The disadvantage of the known prior art is that the charge air cooler is in each case installed as a separate component in a cooling circuit, for example of an internal combustion engine, and cannot be operated without a separate pump.

SUMMARY

The present invention is concerned with the problem of specifying for a charge air cooler of the generic type an improved or at least an alternative embodiment which is characterised in particular by a compact shape.

This problem is solved according to the invention by the subject matter of the independent claims. Advantageous embodiments form the subject matter of the dependent claims.

The invention is based on the general concept of integrating a coolant pump for delivering or circulating the coolant in an indirect charge air cooler, which is known per se, for the intake of an internal combustion engine with a connecting piece for connection to a dedicated low-temperature cooling circuit which conducts coolant and thereby to avoid separate mounting of the same with the associated increased installation space requirement and increased mounting effort. The integration of the coolant pump in the charge air cooler thus makes it possible for an overall much more compact design to be achieved, which is of great advantage in particular with regard to the constantly shrinking space available in modern engine compartments. The coolant pump can of course be integrated in the charge air cooler in such a manner that it can be removed and replaced more easily, for example for maintenance purposes.

In an advantageous development of the solution according to the invention, the coolant pump is integrated in a coolant collecting container of the charge air cooler. This has the great advantage that the coolant collecting container forms a kind of coolant sump, into which the coolant pump projects, as a result of which it can be ensured that it only delivers coolant and not air, for instance. The coolant collecting container is also preferably arranged in such a manner that it is easily accessible for maintenance purposes, so maintenance of the coolant pump is also comparatively simple. The coolant pump can in this case be inserted, for example screwed or clipped, into a recess arranged on the coolant collecting container, as a result of which the mounting of the coolant pump on the coolant collecting container is additionally simplified. The recess, as well as for example the entire coolant collecting container, can be formed from plastic, in particular as a plastic injection-moulded part, as a result of which manufacture of the coolant collecting container and thus also of the charge air cooler is possible in both a cost-effective and very high-quality manner. Alternatively, the coolant collecting container can also be manufactured from other suitable materials such as aluminium.

Further important features and advantages of the invention can be found in the subclaims, the drawings and the associated description of the figures using the drawings.

It is self-evident that the features which are mentioned above and those which are still to be explained below can be used not only in the combination specified in each case, but also in other combinations or alone without departing from the scope of the present invention.

BRIEF DESCRIPTION OF THE DRAWINGS

Preferred exemplary embodiments of the invention are shown in the drawings and are explained in more detail in the following description, with the same reference symbols referring to the same or similar or functionally identical components.

In the figures.

DETAILED DESCRIPTION OF THE DRAWINGS

Figure 1:
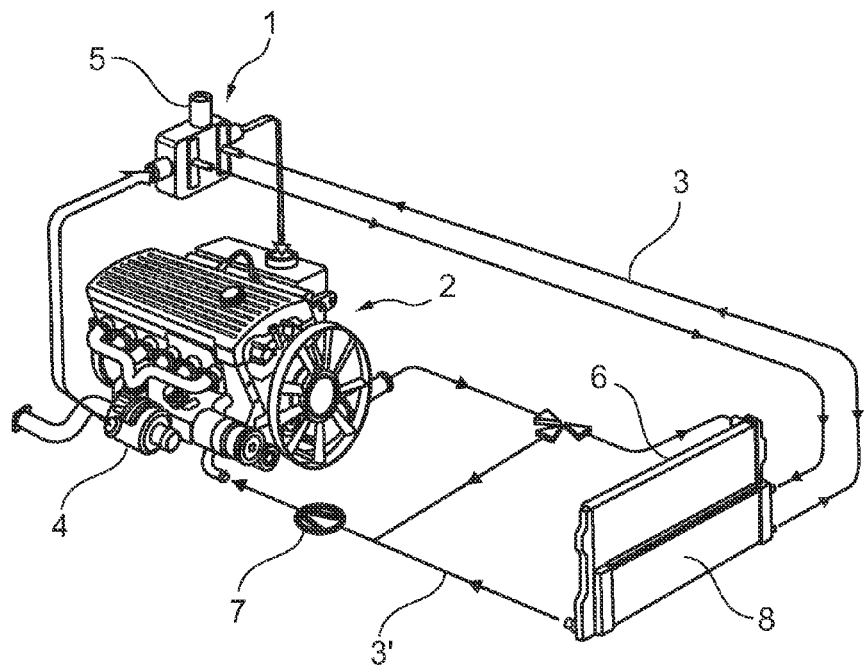
FIG. 1 shows an internal combustion engine with a charge air cooler according to the invention.

According to FIG. 1, an indirect charge air cooler 1 according to the invention of an internal combustion engine 2 is integrated in a low-temperature cooling circuit 3. The charge air cooler 1 is used to cool a compressed charge air flow which is provided by an exhaust-driven turbocharger 4. Until now, a coolant pump for delivering the coolant present in the cooling circuit 3 was required at some point in the cooling circuit 3. In the case of the charge air cooler 1 according to the invention, a coolant pump 5 (cf. also FIGS. 2 and 3) is now integrated directly in the charge air cooler 1. It can be seen in FIG. 1 that in principle two different coolant circuits 3 and 3' are provided, wherein the main coolant circuit 3' is used for cooling the internal combustion engine 2. To this end, a main cooler 6 is integrated in the coolant circuit 3', wherein the coolant is circulated in the coolant circuit 3' by a separate coolant pump 7. The two coolant circuits 3 and 3' are configured separately from each other, that is, there is no fluid connection between them.

In order to cool the coolant in the low-temperature cooling circuit 3, an auxiliary cooler 8 is provided, the cooling output of which is usually lower than the main cooler 6. Due to the integration of the coolant pump 5 in the charge air cooler 1, the said coolant pump no longer has to be arranged separately from the charge air cooler 1 at another point in the course of the coolant circuit 3, as a result of which an advantageous package effect is achieved and the installation space requirement can be reduced. The mounting effort can also be considerably reduced, as the coolant pump 5 can be installed in the charge air cooler 1 in advance and can be integrated together with the latter in the coolant circuit 3. Separate mounting of the coolant pump 5 at another point in the coolant circuit 3 can thereby be omitted.

Figure 2:
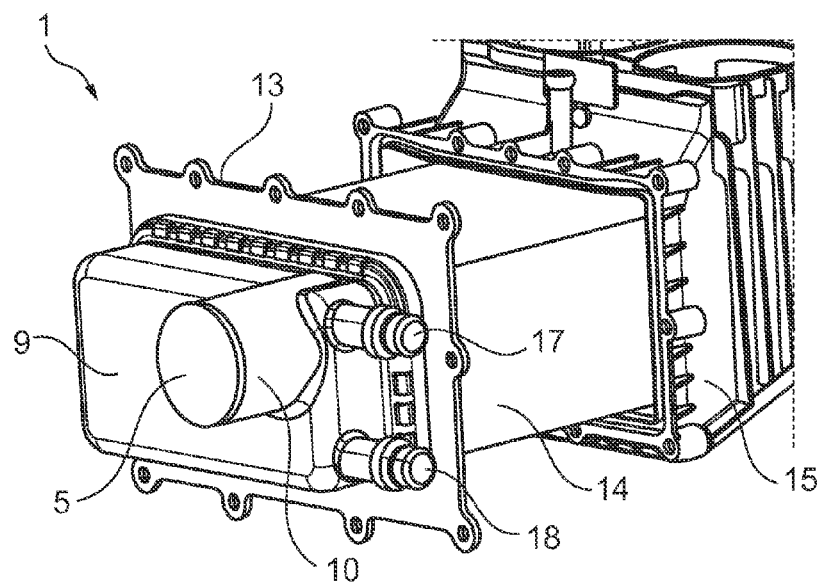
FIG. 2 shows the charge air cooler according to the invention before installation in a charge air duct.
Figure 3:
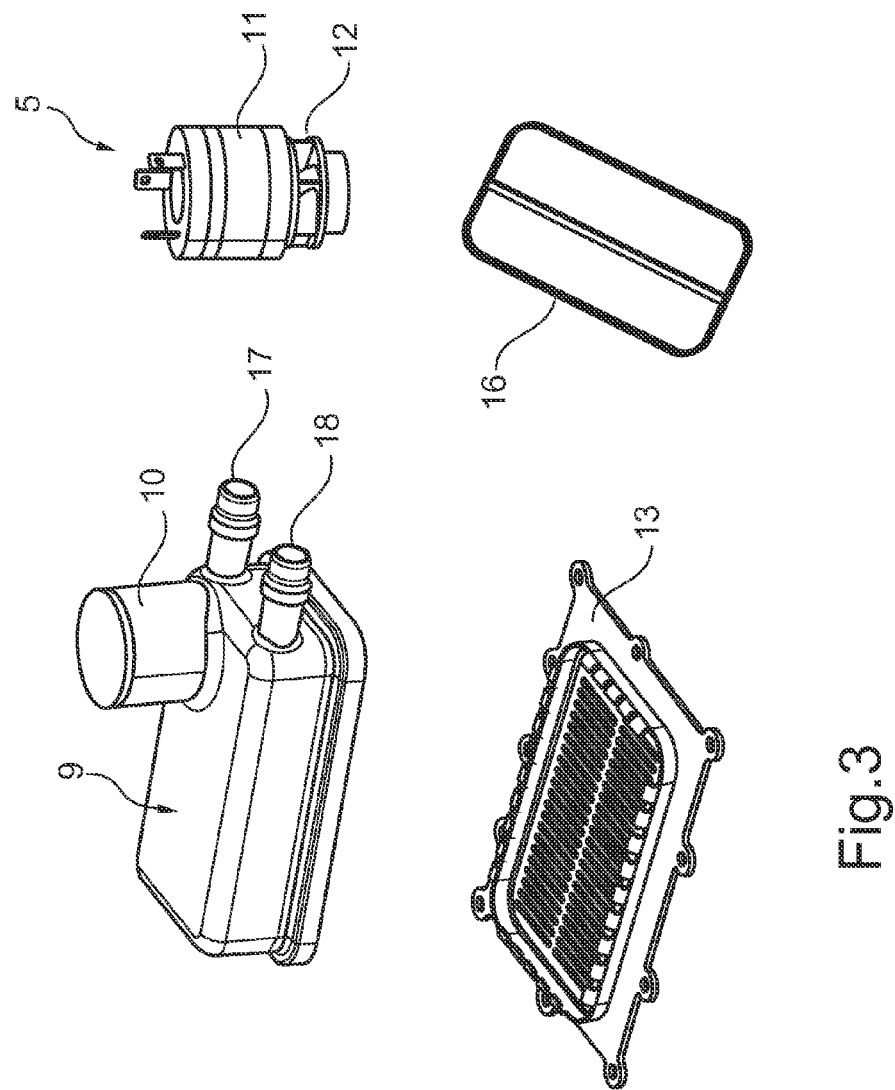
FIG. 3 shows individual components of the charge air cooler according to the invention.

It can be seen from FIGS. 2 and 3 that the coolant pump 5 is integrated in a coolant collecting container 9, also referred to as water tank for short. The coolant collecting container 9 is designed as a kind of coolant sump, as a result of which it can be ensured that the coolant pump 5 is always surrounded by coolant. For mounting the coolant pump 5 in the coolant collecting container 9, the latter has a recess 10 in which the coolant pump 5 can be inserted in a leakproof manner and easily fastened, in particular screwed or clipped. The coolant collecting container 9 is preferably formed from plastic, in particular as a plastic injection-moulded part, and can thereby be produced in a cost-effective yet high-quality manner. As the indirect, liquid-cooled charge air cooler 1 according to the invention is provided in a dedicated low-temperature circuit separate from the main engine cooling circuit, the coolant collecting container can consist of plastic. It can be seen from FIG. 3 that the coolant pump 5 has an electric motor 11 as a drive, on the rotor of which a wheel 12 is arranged in a rotationally fixed manner. The wheel 12, together with an inner wall of the recess 10 of the coolant collecting container 9, forms the coolant pump 5. Furthermore, the coolant collecting container 9 is connected to a heat exchanger device 14 by means of an adapter plate 13 (cf. FIGS. 2 and 3), wherein the heat exchanger device 14 projects into a charge air duct 15 (cf. FIG. 2), and charge air to be cooled flows around it.

The charge air cooler 1 consists of many parallel flat pipes 20 through which coolant flows. There are two adjacent rows of coolant pipes. The flow passes through the cooler in a u-shaped manner; there is therefore an end plate 21 at the end opposite the adapter plate 13, in which end plate the flow of coolant is diverted. This means that the coolant flows down through one row of coolant pipes 20 and back up again through the other row after being diverted in the end plate 21. The coolant pipes 20 are usually soldered to the adapter plate 13 and the end plate. There are also deflector plates 22 which are arranged around the coolant pipes 20. What are known as cut fins (not shown) are generally arranged between each pair of coolant pipes 20 in order to optimise the output of the charge air cooler 1.

The charge air cooler 1 is fastened to the charge air duct 15 by means of the adapter plate 13, for example by means of a screw-fastening of the same to the charge air duct 15. Another corresponding seal (not shown) is of course arranged between the adapter plate 13 and the charge air duct 15. The seal 16 lies between the adapter plate 13 and the coolant collecting container 9 and provides a leakproof separation of the coolant flowing into the charge air cooler 1 and the coolant flowing out. The coolant collecting container 9 is fastened to the adapter plate 13 by clamping. A connecting piece (inflow) 17 and an outflow 18 for the coolant to be delivered are likewise integrated in the coolant collecting container 9.

The coolant pump 5 can be positioned on the outflow side, as shown in FIG. 3, or on the inflow side in the coolant collecting container 9.

It is thus possible with the charge air cooler 1 according to the invention to integrate the latter in the coolant circuit 3 in a space-optimised yet maintenance-friendly manner. A separate housing for the coolant pump 5, which is formed according to the invention by the coolant collecting container 9, can also be omitted, as result of which a reduction in the number of parts and in the mounting effort can be achieved.

The invention claimed is:

1. A charge air cooler, comprising:
    at least one connecting piece, the at least one connecting piece is configured to connect the charge air cooler to a cooling circuit in an intake system, the cooling circuit configured to conduct a coolant;
    at least one coolant pump configured to deliver the coolant, the at least one coolant pump is integrated in at least one flow path within the charge air cooler; and
    a cooler for cooling the coolant is integrated in the cooling circuit;
    wherein the coolant pump is integrated in a coolant collecting container of the charge air cooler, the coolant collecting container having a recess into which the coolant pump is arranged, wherein the recess in the coolant collecting container, together with a propeller of the coolant pump, forms an impeller.

2. The charge air cooler according to claim 1, wherein the coolant collecting container is a plastic injection-moulded part.

3. The charge air cooler according to claim 1, wherein the coolant collecting container is connected to a heat exchanger device by an adapter plate, wherein the heat exchanger device projects into a charge air duct and charge air to be cooled flows around it.

4. The charge air cooler according to claim 1, wherein the coolant pump has an electric motor.

5. The charge air cooler according to claim 1, wherein the coolant pump is selectively securely insertable into the recess of the coolant collecting container.

6. A charge air cooler, comprising:
    at least one connecting piece, the at least one connecting piece connecting the charge air cooler to a cooling circuit in an intake of an internal combustion engine, the cooling circuit configured to conduct a coolant;
    at least one coolant pump for delivering a coolant, the at least one coolant pump is integrated in at least one flow path within the charge air cooler; and
    a coolant collecting container having a recess, into which the coolant pump is integrally inserted;
    wherein the recess in the coolant collecting container, together with a propeller of the coolant pump, forms an impeller.

7. The charge air cooler according to claim 6, wherein the coolant collecting container is a plastic injection-moulded part.

8. The charge air cooler according to claim 6, wherein the coolant collecting container is connected to a heat exchanger device by an adapter plate, wherein the heat exchanger device projects into a charge air duct and charge air to be cooled flows around it.

9. The charge air cooler according to claim 6, wherein the coolant pump has an electric motor.

10. The charge air cooler according to claim 6, further comprising a cooler for cooling the coolant integrated into the cooling circuit.

11. The charge air cooler according to claim 6, wherein the coolant pump is selectively securable into the recess via at least one of fastening and clipping.

12. The charge air cooler according to claim 8, further comprising a seal configured to provide a tight connection disposed between the coolant collecting container and the adapter plate.

13. A cooling system for an internal combustion engine, comprising:

a charge air cooler in fluid communication with a cooling circuit in an intake of the internal combustion engine, the cooling circuit configured to conduct a coolant, the charge air cooler including:

a coolant pump for delivering the coolant, the coolant pump integrated into at least one flow path within the charge air cooler, the coolant pump having a propeller; and a coolant collecting container having at least one connecting piece coupling the charge air cooler to the cooling circuit, the coolant collecting container having a recess into which the coolant pump is integrally arranged;

wherein the recess in the coolant collecting container together with the propeller of the coolant pump forms an impeller.

14. The cooling system according to claim 13, further comprising a cooler for cooling the coolant integrated into the cooling circuit.

15. The cooling system according to claim 13, wherein the coolant collecting container includes a plastic injection-moulded part.

16. The cooling system according to claim 13, wherein the coolant collecting container is connected to a heat exchanger device via an adapter plate, wherein the heat exchanger device projects into a charge air duct and charge air to be cooled flows around it.

17. The cooling system according to claim 16, further comprising a seal configured to provide a tight connection disposed between the coolant collecting container and the adapter plate.

18. The cooling system according to claim 13, wherein the coolant pump has an electric motor.

19. The cooling system according to claim 13, wherein the coolant pump is selectively securely insertable into the recess of the coolant collecting container.

20. The coolant system according to claim 19, wherein the coolant pump is configured to be at least one of screwed and clipped into the recess.

* * * * *